(12) United States Patent
Tagashira et al.

(10) Patent No.: US 9,022,175 B2
(45) Date of Patent: May 5, 2015

(54) MACHINE TOOL, WORKING FLUID SUPPLY APPARATUS, AND WORKING FLUID

(75) Inventors: Kohsuke Tagashira, Hokkaido (JP); Shin-ichi Ikeda, Hokkaido (JP); Masaya Yamasaki, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 239 days.

(21) Appl. No.: 13/579,615

(22) PCT Filed: Jan. 31, 2011

(86) PCT No.: PCT/JP2011/052450
§ 371 (c)(1),
(2), (4) Date: Aug. 17, 2012

(87) PCT Pub. No.: WO2011/105199
PCT Pub. Date: Sep. 1, 2011

(65) Prior Publication Data
US 2012/0315104 A1    Dec. 13, 2012

(30) Foreign Application Priority Data
Feb. 24, 2010    (JP) .................................. 2010-038316

(51) Int. Cl.
*B23Q 11/12* (2006.01)
*B21B 45/02* (2006.01)
*B23Q 11/10* (2006.01)

(52) U.S. Cl.
CPC .................................. *B23Q 11/1061* (2013.01)

(58) Field of Classification Search
CPC ............... B23Q 11/10; B23Q 11/1038; B23Q 11/1061; B23Q 11/1069; B23Q 11/12; B23Q 11/141
USPC .......................... 184/6.14; 72/41, 42; 508/110
See application file for complete search history.

(56) References Cited

U.S. PATENT DOCUMENTS

| 2,704,363 | A | * | 3/1955 | Armstrong .................... 508/136 |
| 5,052,618 | A | * | 10/1991 | Carlon et al. ................... 239/77 |
| 5,524,465 | A | * | 6/1996 | Kajiwara et al. ................. 72/42 |
| 6,951,609 | B2 | * | 10/2005 | Yamanaka et al. ............. 210/202 |
| 7,266,984 | B2 | * | 9/2007 | Cerv et al. ....................... 72/236 |
| 2006/0154997 | A1 | * | 7/2006 | Inoue et al. ..................... 521/25 |
| 2007/0199359 | A1 | | 8/2007 | Rajagopalan et al. | |

FOREIGN PATENT DOCUMENTS

| JP | 4-78932 U | 7/1992 |
| JP | 7-115276 B | 12/1995 |
| JP | 2000045018 A | 2/2000 |
| JP | 2003094283 A | 4/2003 |
| JP | 2004182879 A | 7/2004 |
| JP | 3753728 B | 3/2006 |
| JP | 2007229894 A | 9/2007 |
| JP | 2010006950 A | 1/2010 |
| WO | 2008108314 A1 | 9/2008 |

* cited by examiner

*Primary Examiner* — William E Dondero
*Assistant Examiner* — Minh Truong
(74) *Attorney, Agent, or Firm* — Paul & Paul

(57) ABSTRACT

A machine tool (1) for processing a workpiece (2) by relative movement of a tool (18) with respect to the workpiece (2), including a homogenizer (15) into which water and oil are taken to disperse oil homogeneously in water, a working fluid produced in homogenizer (15) being supplied to a work area for processing of the workpiece.

6 Claims, 3 Drawing Sheets

MACHINE TOOL, WORKING FLUID SUPPLY APPARATUS, AND WORKING FLUID

TECHNICAL FIELD

The present invention relates to a machine tool, a working fluid supply device, and a working fluid for machine processing of a workpiece, such as cutting, grinding and honing of a workpiece while supplying a working fluid.

BACKGROUND ART

A working fluid supplied during machine processing of a workpiece has various actions as described below. The working fluid has lubricating action in which the working fluid permeates between a workpiece and a tool or between a tool and chips generated by processing to reduce friction at the boundary surface, anti-fusion action in which the working fluid prevents generation of built-up edge or fusion of chips to a tool, and cooling action in which the working fluid absorbs friction heat generated between a workpiece and a tool or between a tool and chips or heat generated in shearing of metal, or the working fluid cools a workpiece or a tool. These actions of the working fluid vary according to the type of the working fluid. An oily working fluid using only oil has strong lubricating action and anti-fusion action and is effective in reducing crater wear of tool rake face or flank wear of a tool. A water soluble working fluid using oil diluted in water has strong cooling action and is effective in reduction of tool wear and improvement in quality of a finished surface. In general, the oily working fluid cannot be used in a high processing temperature since there is a risk of spontaneous ignition of the working fluid, and therefore it is used only in processing at low speed where there is no risk of ignition or in processing of a workpiece for which processing temperature is never high. Although the water soluble working fluid is weaker in lubricating action and anti-fusion action than the oily working fluid, there is no risk of spontaneous ignition of the working fluid and is therefore used more widely. Thus, for machining at high speed or for processing of a hard cutting material for which processing temperature is high, a water soluble working fluid is used.

An example of working fluid previously used in metal cutting is disclosed in Patent Literature 1. The invention described in Patent Literature 1 discloses a water soluble oily metal working fluid. It is described in Patent Literature 1 that the water soluble oily metal working fluid contains a base oil, fine boron nitride powder, and an emulsifier, and the boron nitride powder contains primary particles with a mean particle diameter of not greater than 0.5 µm. Also, it is described that an anionic surfactant, non-ionic surfactant, or mixture thereof is used as an emulsifier.

A homogenizer is a device that pulverizes particles and disperses it in a fluid homogeneously. There are two types of homogenizers, i.e., a pressure-type homogenizer in which a pressurized mixture liquid containing particles impinges to an impact ring at high speed to thereby pulverize the particles finely so as to be dispersed in a liquid, and a rotor-stator-type homogenizer in which a liquid mixture containing particles is supplied to a narrow gap between a rotor and a stator and the rotor is rotated at high speed to pulverize the particles and disperse them in the liquid. A conventional example of a pressure-type homogenizer is disclosed in Patent Literature 2. Patent Literature 2 describes a pressure type homogenizer that uses a valve component having high erosion resistance to disperse hard ceramic powder in a liquid.

A working fluid is generally produced outside of the machine tool in advance, and is stored in a tank belonging to the machine tool until usage. When the quantity of the working fluid in the tank decreases, an operator replenishes the working fluid. A machine tool that is run in automatic operation for a long time may be provided with a working fluid supply apparatus that can automatically replenish the working fluid. An example of working fluid supply apparatus as an auxiliary apparatus of a machine tool is disclosed in Patent Literature 3. Patent Literature 3 discloses production of a working fluid by mixing a raw working fluid supplied from a tank with pressurized water supplied from outside in a jet pump of a mixing machine. It is also disclosed that the raw fluid is forced by the swirling blade provided in the inner cylinder of the jet pump into turbulent swirling flow so that homogeneous dispersion can be achieved.

CITATION LIST

Patent Literature 1:
Japanese Patent No. 3753728
Patent Literature 2:
Japanese Unexamined Utility Model Publication No. 04-78932
Patent Literature 3:
Japanese Examined Patent Publication No. 07-115276

SUMMARY OF INVENTION

Heat resistant steel, such as nickel alloy or stainless steel for which machining temperature tends to be high, and aluminum alloy and titanium alloy which tend to be fused and adhered to a cutting edge of a tool, reduce usable life of a tool. In machining of aluminum alloy or titanium alloy, chips generated by processing tend to fuse and adhere to a cutting edge of a tool, and thus induce chipping and lead to reduction of tool life. In processing of these metals, a water soluble working fluid obtained by mixing water and oil in a prescribed ratio is used to lower the processing temperature and suppress fused adhesion of metal in order to extend usable lifetime of the tool. Water and oil that have no co-solubility are used in the water soluble working fluid, so that an emulsifier is added to ensure homogeneous dispersion of oil particles in water. The water soluble working fluid containing an emulsifier is generally referred to as an emulsion type water soluble working fluid. As described in Patent Literature 1, an emulsifier is an anionic surfactant, a non-ionic surfactant, or mixture of them. Since an emulsifier has an effect of reducing surface tension, it can advantageously disperse oil in water so as to form a homogeneous working fluid. On the other hand, there is a problem that, when the emulsifier is used in processing of metals such as titanium alloy, nickel alloy, or aluminum alloy, tool lifetime tends to be shortened. There is also a problem that, since tap water containing hydroxide ion is used as water in the working fluid, hydroxide ion tends to be bound to the surface of workpiece immediately after machining, and this obstructs adhesion of oil particles on the metal surface.

The present invention has been done in order to resolve above-described problems. Thus, it is an object of the present invention to provide a machine tool, a working fluid supply apparatus, and a working fluid capable of extending lifetime of a tool when processing metal such as titanium alloy, nickel alloy or aluminum alloy by using a water soluble working fluid.

In order to attain the above-described object, in accordance with the present invention, there is provided a machine tool for processing a workpiece by relative movement of a tool with respect to the workpiece, including a homogenizer into which water and oil are taken to disperse the oil in the water, wherein a working fluid produced in the homogenizer is supplied to a work area for processing of the workpiece. The homogenizer is preferably provided halfway in a working fluid supply piping that leads from a working fluid supply apparatus to the work area.

The machine tool having such a construction is capable of producing a working fluid that is not easily separated into water and oil by dispersing oil homogeneously in water without using an emulsifier prior to processing, and supplying the working fluid to the work area for processing.

Also, in accordance with the present invention, there is provided a working fluid supply apparatus for supplying a working fluid to a machine tool, including a homogenizer into which water and oil are taken to disperse the oil in the water. As water, deionized water is preferably used. The apparatus may also include an ion exchanger for producing deionized water. The apparatus may further include a working fluid tank for storing a working fluid produced in the homogenizer, and a pump for extracting the working fluid stored in the working fluid tank. The apparatus may further include a pump for drawing liquid from the upper layer and lower layer, respectively, of the working fluid recovered from the machine tool and stored or of stored liquid mixture of the water and the oil, and introducing the liquid from the upper layer and the liquid from the lower layer in mixed state into the homogenizer. The homogenizer may be a pressure type homogenizer having a gap for introducing pressurized liquid mixture of the water and the oil, and a processing chamber which causes the fluid mixture accelerated in passing through the gap to impinge on a wall surface while reducing pressure so as to disperse oil in water.

The working fluid supply apparatus having this construction can disperse oil uniformly in water without using an emulsifier, and thus can produce a working fluid that is not easily separated into water and oil, and can supply the working fluid to a machine tool.

Also, in accordance with the present invention, there is provided a working fluid supplied to work area of a machine tool, the working fluid being produced by introducing water and oil in a prescribed ratio to a homogenizer, and then dispersing oil in water without using an emulsifier. It is preferable to use oil having high boiling point such as heat treating oil.

As described above, in accordance with the machine tool of the present invention, a homogenizer can be used to produce a water soluble working fluid in which water and oil having no co-solubility with each other are uniformly dispersed without using an emulsifier. Since water and oil in the produced working fluid are not easily separated, desired action and effect of the working fluid can be obtained for as long time period. By supplying this working fluid to the work area of a machine tool, tool lifetime can be significantly increased in processing of a metal such as titanium alloy, nickel alloy, aluminum alloy, etc., which tends to shorten lifetime of a tool due to chipping or wearing, or in processing of any other metal. As a result, productivity can be improved, and processing cost including cost of tools can be reduced. The construction of the homogenizer is not particularly limited, and either a pressure type or a rotor-stator type homogenizer can be used.

Since the homogenizer is provided in the halfway of the working fluid supply piping that leads from the working fluid supply apparatus to the work area of the machine tool, the homogenizer can produce a working fluid having oil uniformly dispersed in water even if the working fluid stored in the tank of working fluid supply apparatus is separated into water and oil due to long term storage.

According to a working fluid supply apparatus of the present invention, an aqueous working fluid which has oil uniformly dispersed in water and is not easily separated into water and oil can be produced without using an emulsifier. By using this working fluid, tool lifetime can be extended in processing of metal such as, for example, titanium alloy, nickel alloy or aluminum alloy, or in processing of any other metal. Since deionized water can be used to produce a working fluid not containing hydroxide ion, oil particles are more easily attached to the surface of metal of a workpiece and fused adhesion of chips to a tool can be suppressed. A working fluid or mixture of water and oil stored in the tank is extracted from the upper layer and from the lower layer separately and introduced into the homogenizer, so that the working fluid containing water and oil in a prescribed mixing ratio can be produced. When a pressure type homogenizer is used, it can be used in a relatively simple construction for collision of the liquid mixture of water and oil to an impact ring to give rise to cavitation, so as to lead to production of the working fluid having oil homogeneously dispersed in water. By storing the homogenized working fluid in a tank, sufficient quantity of the working fluid can be supplied as required and the machine tool can be run for a long time.

Since, in the working fluid of the present invention, no emulsifier is used that may shorten lifetime of a tool, tool lifetime in processing of any metal including titanium alloy, nickel alloy and aluminum alloy can be increased. Since the aqueous working fluid is used, risk of fire is reduced. In this case, oil having high boiling point such as heat treating oil can be advantageously used, since, when fine particles of oil in the working fluid come into contact with a workpiece or a tool or chips at high temperature, the oil is not easily vaporized. Therefore, deterioration of the performance of the working fluid can be suppressed. Chipping of a tool due to shock of vaporization of oil in the working fluid can also be suppressed.

DESCRIPTION OF EMBODIMENTS

Figure 1:
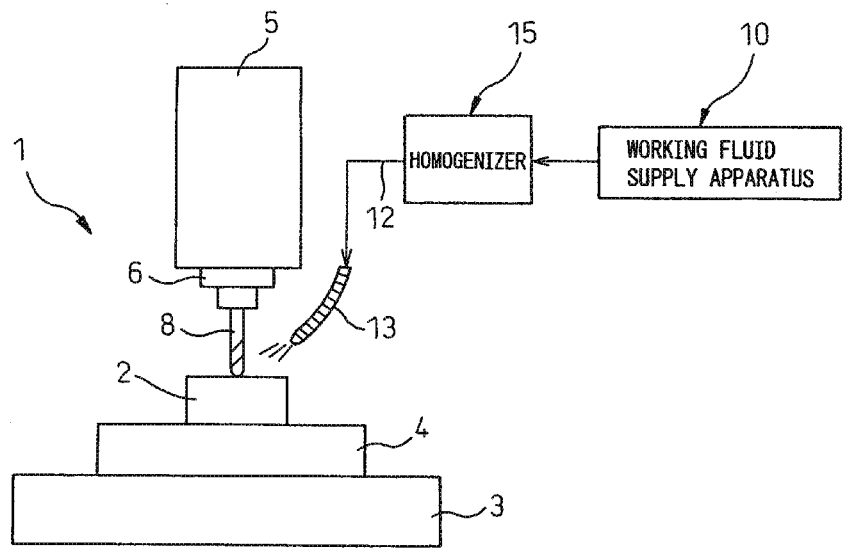
FIG. 1 is a view showing a machine tool according to an embodiment of the present invention.

Hereafter, a machine tool according to an embodiment of the present invention will be described in detail. FIG. 1 is a view showing a machine tool of the present embodiment. The machine tool of the present invention is not limited to the vertical machining center as shown in FIG. 1, but a horizontal machining center, a turning center, or other machine tool may be included in the scope of the present invention.

As shown in FIG. 1, the machine tool 1 of the present embodiment includes a table 4 fixed on a base 3, a slide stage (not shown) that slides along a linear motion guide on the base 3, a column (not shown) that slides along a linear motion guide on the slide stage, a spindle head 5 supported movably in vertical direction on the column, and a spindle 6 rotatably supported on the spindle head 5. The spindle 6 and the table 4 can move relative to each other in three mutually orthogonal directions. An end mill 8 is mounted on the spindle 6, and a workpiece 2 is attached to the table 4. Further, the machine tool 1 includes a homogenizer 15 into which a working fluid consisting of the mixture of water and oil pressurized at a prescribed pressure and not containing an emulsifier is taken from working fluid supply apparatus 10 outside the machine, and which pulverizes the oil and disperses it uniformly in the water. The homogenized working fluid is supplied to the work area of the machine tool via a coolant nozzle 13 connected to the working fluid supply piping 12. In place of using the coolant nozzle, the homogenized working fluid may be introduced from the rear part of the spindle 6 into the interior of the spindle 6, and passed through the interior of the spindle 6 and the end mill 8, and then supplied to the work area from the distal end of the end mill 8. The homogenizer 15 is not limited to the pressure-type homogenizer as shown in FIG. 4, and it is also possible to use a rotor-stator type homogenizer in which water and oil are introduced into a minute gap between a rotor and a stator, and the oil is homogeneously dispersed in water by high speed rotation of the rotor.

Type and component of the aqueous working fluid used in processing is not particularly limited except that no emulsifier is contained. As the oil, fatty acid such as oleic acid, stearic acid, etc., animal oil and vegetable oil, mineral oil, synthetic oil, and mixture of them may be used. As water, tap water, deionized water not containing hydroxide ion, may be used. Mixing ratio of oil to water is, for example, 5 wt %~50 wt %, and preferably 10 wt %~30 wt %. In order to increase lubricating action of the aqueous working fluid, fine powder of solid lubricant such as silica, boron nitride, diamond, etc., may be included. The particle diameter of the fine powder is in the order of nanometers to micrometers. As deionized water, ion-exchanged water, distilled water, or pure water may be used.

Figure 4:
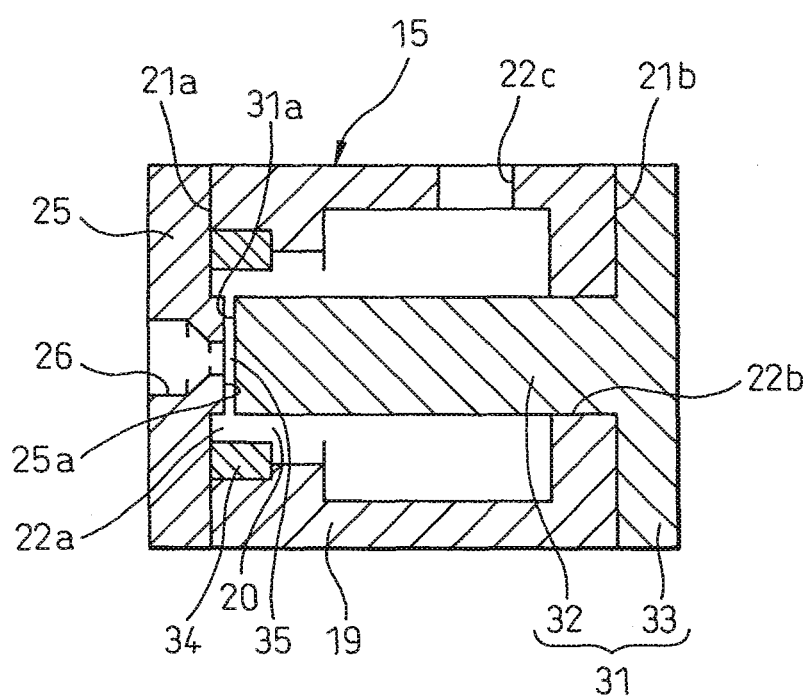
FIG. 4 is a sectional view showing a pressure type homogenizer.

As shown in FIG. 4, the pressure-type homogenizer 15 includes a housing 19 having a processing chamber 20 inside, and a valve seat 25 mounted to the front end surface 21a of the housing 19 with valve seat surface 25a faced to the processing chamber 20. The valve seat 25 has a inlet port 26 for the working fluid introduced at high pressure into the interior of the homogenizer 15. A narrow gap 35 is formed between the valve seat surface 25a and the valve front end surface 31a. The valve front end surface 31a is, for example, in the form of a circle of 30 mm in diameter. On the inner wall surface of the housing at the outer circumference of the gap 35, an impact ring 34 is provided, so that the mixture of water and oil passing through the gap 35 impinges on the impact ring at high speed. The impact ring 34 is a consumable part to be replaced when worn out by impingement of the liquid mixture at high speed, and is constructed from material having high wear resistance such as ceramics, cemented carbide, etc. In the present embodiment, in order to facilitate replacement of the impact ring 34, the housing 19 and the impact ring 34 are formed separately. Liquid mixture of water and oil is accelerated when passing through the gap 35, and impinges on the impact ring 34. The impact force exerted by the impact on the impact ring and cavitation arising from pressure reduction in the processing chamber 20 produce the working fluid in which fine particles of oil of size in the order of a few micrometers are uniformly dispersed in water.

The housing 19 has a front end opening 22a in communication with the processing chamber 20, a rear end opening 22b, and a discharge port 22c for discharging the homogenized working fluid. A valve seat 25 is mounted to the front end surface 21a, and liquid mixture is introduced via the inlet port 26 in communication with the front end opening 22a into the processing chamber 20. A valve 31 is fitted into the rear end opening 22b, and the valve front surface 31a is opposed to the valve seat surface 25a with a prescribed gap 35. The valve 31 is fitted so as not to form a gap to the rear end opening 22b. Size of the gap 35 between the valve front surface 31a and the valve seat surface 31a is adjustable, and set in accordance with the particle size and viscosity of the oil of the introduced liquid mixture and the pressure of the working fluid. For example, when the particle size is large and viscosity of the oil is high, the gap 35 is set wide, and when the particle size is small and viscosity of the oil is low, the gap 35 is set narrow. When the working fluid containing oleic acid and water is used and oil particles of a few μm in diameter is produced at a pressure of 11 MPa, the gap 35 between the valve front end surface 31a and the valve seat surface 25a is set to about 0.1 mm. If the gap 35 between the valve front end surface 31a and the valve seat surface 25a is narrow, production capacity of producing the homogenized working fluid is reduced and sufficient amount of the working fluid cannot be supplied to the work area. In such case, sufficient amount of the working fluid can be supplied by providing a tank for storing the homogenized working fluid for the machine tool 1. The liquid mixture of water and oil impinges on the impact ring 34 at high speed, and pressure is reduced in the processing chamber 20, so that oil particles are uniformly dispersed in water by the impact force and cavitation. The homogenized working fluid is discharged from the discharge port 22c to be fed via the working fluid supply piping 12 to the work area.

The valve seat 25 is formed from same material as the housing 19. The inlet port 26 to which liquid mixture pressed at a prescribed pressure is introduced is formed narrower on the outlet side of the working fluid than on the inlet side. The liquid mixture is accelerated when passing from the inlet port 26 through the gap 35, and then impinges on the impact ring 34.

The valve 31 is formed as the valve seat 25 from same material as the housing 19. The valve 31 has a base part 33 fixed to the rear end surface 21b of the housing 19, and a protrusion 32 fitted into the rear end opening 22b of the housing 19 to project into the processing chamber 20. The distal end surface of the protrusion 32 is formed as the valve surface 31a. The gap 35 is formed between the valve surface 31a and the opposing valve seat surface 25a.

As described above, the machine tool 1 of the present embodiment includes the homogenizer 15 for producing the working fluid with oil uniformly dispersed in water, so that water and oil particles having no co solubility can be kept in the state not easily separated for a long time without using emulsifier. By supplying this working fluid to the work area, tool lifetime can be significantly extended in processing of metal such as titanium alloy, nickel alloy, aluminum alloy, etc., which are likely to shorten tool lifetime by chipping, wear, etc. As compared to the case where titanium alloy is processed with an carbide end mill by using the water soluble working fluid of a commercially available emulsion type containing emulsifier, tool lifetime that is about four times longer can be obtained. In the present embodiment, since the homogenizer 15 is provided halfway in the working fluid supply piping 12 leading from the working fluid supply apparatus 10 to the work area, even if the working fluid in the tank of the working fluid supply apparatus 10 is separated into water and oil due to elapse of time, the homogenizer 15 can regenerate the working fluid having oil homogeneously dispersed in water, and stable processing is thereby ensured.

As oil in the working fluid, heat treating oil, for example, that has high boiling point in accordance with JIS K2242 can be used. Therefore, even if the oil particles dispersed in the working fluid is brought into contact with hot workpiece, a tool or chips at high temperature, the oil is not easily evaporated so that deterioration of the working fluid can be suppressed. When oil having low evaporation temperature (low boiling point) is used, chipping of a tool is likely to occur due to shock of evaporation of oil particles. Thus, chipping can be suppressed by using a heat treating oil having a high boiling point. Even when fine particles of solid lubricant are contained in the working fluid, the homogenizer can disperse the fine particles of solid lubricant homogeneously in water, so that they are not easily separated from the water.

Figure 2:
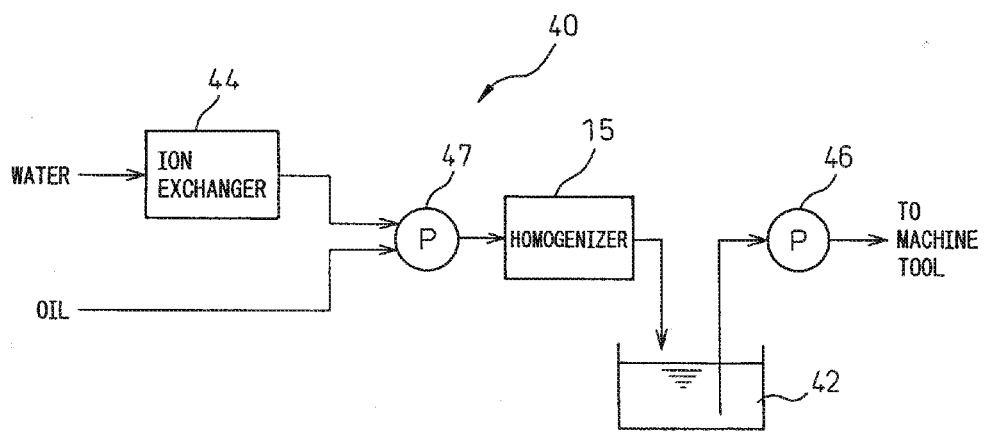
FIG. 2 is a block diagram showing a working fluid supply apparatus according to a first embodiment.

Next, referring to FIG. 2, a first embodiment of a working fluid supply apparatus according to the present invention will be described. Unlike the working fluid supply apparatus 10 shown in FIG. 1, the working fluid supply apparatus 40 of the present embodiment includes a homogenizer 15 and a tank 42 for storing the homogenized working fluid. As homogenizer 15, the pressure type homogenizer shown in FIG. 4 as described above can be used. In the homogenizer 15 of the present embodiment, deionized water ion-exchanged by an ion exchanger 44 and oil are introduced. In place of tap water containing hydroxide ion, deionized water containing no hydroxide ion is used so that bonding of hydroxide ion to the metal surface of the workpiece immediately after processing can be suppressed. Therefore, oil is attached directly to the surface of the workpiece, and the lubricating action of the working fluid is enhanced. As a result, chips are prevented from adhering by fusion to the tool, and the occurrence of chipping is suppressed. The homogenized working fluid is extracted with a pump 46 from the tank 42, and is supplied to the work area. Thus, a sufficient amount of the working fluid can be supplied to the work area.

Figure 3:
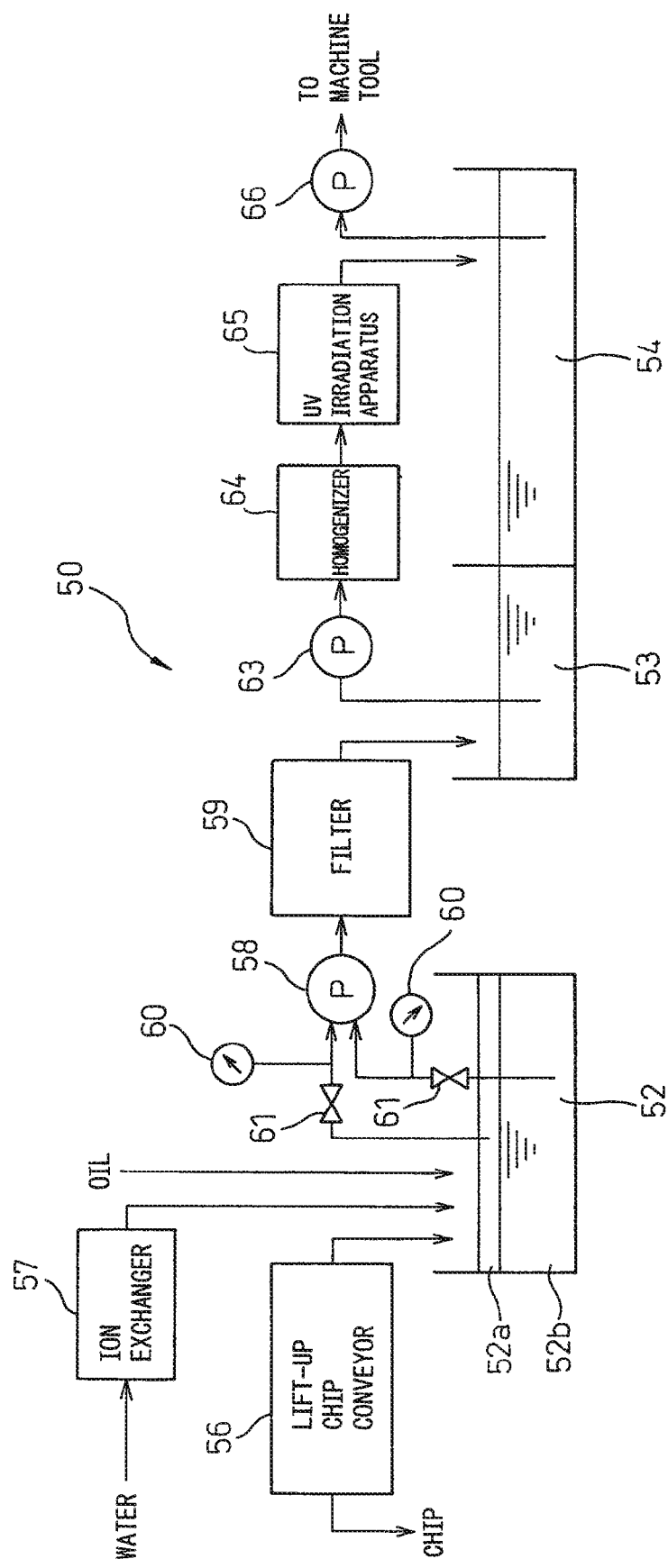
FIG. 3 is a block diagram showing a working fluid supply apparatus according to a second embodiment.

FIG. 3 is a view showing a second embodiment of the working fluid supply apparatus of the present invention. A working fluid supply apparatus 50 of this embodiment includes a primary tank 52 for recovering the working fluid used in the processing, and can be advantageously used with a machine tool that is automatically run for a long time. The working fluid is conveyed from the machine tool together with chips, and separated into chips and the working fluid by a lift-up chip conveyor 56. The separated working fluid is stored together with deionized water for replenishment ion-exchanged in an ion exchanger 57 and replenished new oil in the primary tank 52. Commercially available deionized water or deionized water generated in advance by other means may be used. Liquid from the upper layer 52a and lower layer 52h of the liquid mixture of the water and oil in the primary tank 52 is respectively extracted with a pump 58, and is supplied to a filter 59. As the filter 59, a rotary cyclone filter may be used, and fine chips are removed by the filter and the working fluid is stirred to some extent with this filter. Upper layer 52a is a layer containing more oil, and the lower layer 52h is a layer containing more water. When respective liquid is drawn up from the upper and lower layers 52a, 52b with the pump 58, an operator watches each flow meter 60 and adjusts the flow rate by opening and closing each throttle valve 61 to obtain desired mix ratio of water and oil. The drawing pipe for drawing liquid from the upper layer 52a is constructed such that it moves up and down with a float in order to draw liquid always near the liquid surface.

The mixed liquid of water and oil is passed through the filter 59 and is temporarily stored in the secondary tank 53. The pressurized working fluid drawn from the secondary tank 53 with the pump 63 is introduced into the homogenizer 64, and oil is homogeneously dispersed in water to produce a working fluid. The produced working fluid is subjected to sterilization treatment with UV irradiation apparatus 65, and is stored in tertiary tank 54. The UV irradiation apparatus 65 is effective for prevention of corrosion of the working fluid. The working fluid drawn from the tertiary tank 54 with a pump 66 is supplied to the work area. The working fluid supply apparatus 50 of the present embodiment is suitable to be arranged in the production line and to be used with a machine tool operated for a long time. By using this working fluid supply apparatus 50, continuous and stable processing can be performed without separation of the working fluid into water and oil.

As described above, the aqueous working fluid having oil homogeneously dispersed in water can be produced without using an emulsifier. By using this working fluid, wear resistance and anti-chipping property of a tool can be increased in processing of all metal including titanium alloy, nickel alloy and aluminum alloy, and tool lifetime can be thereby extended. Thus, productivity of metal processing is increased, and processing cost including tool cost can be reduced.

The present invention is not limited to the above-described embodiments, and can be implemented in various modification without departing from the spirit and scope of the invention.

REFERENCE SIGNS LIST 1 machine tool
10, 40, 50 working fluid supply apparatus
15 homogenizer
19 housing
25 valve seat
31 valve
34 impact ring
35 gap

The invention claimed is:

1. A working fluid supply apparatus for supplying a working fluid to a machine tool, the working fluid supply apparatus comprising:
 a primary tank for holding a fluid, the fluid in said primary tank forming an upper layer and a lower layer;
 a pump for drawing fluid from the upper layer and fluid from the lower layer and providing a pump output including the fluid from the upper layer and the fluid from the lower layer in a mixed state;
 a first valve configured to be adjustable, said first valve being connected between said pump and a pipe for drawing the fluid from the upper layer and being configured to adjust a flow rate of the fluid from the upper layer;
 a second valve configured to be adjustable, said second valve being connected between said pump and a pipe for drawing the fluid from the lower layer and being configured to adjust a flow rate of the fluid from the lower layer; and
 a homogenizer into which a homogenizer input fluid obtained from the pump output is received to disperse the fluid from the upper layer in the fluid from the lower layer, said homogenizer producing the working fluid for supplying operation of the machine tool wherein the pump is a first pump and said pump output is a first pump output, the working fluid supply apparatus further comprising: a filter receiving the first pump output to remove fine chips from the first pump output to produce a filtered fluid mixture; a secondary tank for receiving and storing the filtered fluid mixture; and a second pump for drawing the filtered fluid mixture from said secondary tank and providing a second pump output including the filtered fluid mixture, wherein the second pump output provides the homogenizer input fluid.

2. The working fluid supply apparatus according to claim 1, further comprising an ion exchanger, wherein deionized water produced by the ion exchanger is supplied to said primary tank.

3. The working fluid supply apparatus according to claim 1, wherein the homogenizer is a pressure type homogenizer having a gap and a processing chamber, wherein said gap causes the homogenizer input fluid to be accelerated in passing through said gap to impinge on a wall surface while reducing pressure so as to disperse the fluid from the upper layer in the fluid from the lower layer.

4. The working fluid supply apparatus according to claim 1, further comprising:
   a tertiary tank for receiving and storing the working fluid produced by said homogenizer; and
   a third pump for drawing the working fluid from said tertiary tank and supplying the working fluid to the machine tool.

5. The working fluid supply apparatus according to claim 4, further comprising:
   UV irradiation apparatus for sterilization treatment of the working fluid produced by said homogenizer.

6. The working fluid supply apparatus according to claim 5, wherein the working fluid produced by said homogenizer passes through said UV irradiation apparatus before the working fluid produced by said homogenizer is received in said tertiary tank.

\* \* \* \* \*